United States Patent
Lee et al.

(10) Patent No.: US 9,559,396 B2
(45) Date of Patent: Jan. 31, 2017

(54) SOLID ION CONDUCTOR, SOLID ELECTROLYTE INCLUDING THE SAME, LITHIUM BATTERY INCLUDING THE SOLID ELECTROLYTE, AND METHOD OF MANUFACTURING THE SOLID ION CONDUCTOR

(71) Applicants: Samsung Electronics Co., Ltd., Suwon-si, Gyeonggi-do (KR); Korea University Research and Business Foundation, Seoul (KR)

(72) Inventors: Jae-myung Lee, Seoul (KR); Tae-young Kim, Seoul (KR); Young-sin Park, Suwon-si (KR); Seung-wook Baek, Hwaseong-si (KR); Jong-heun Lee, Seoul (KR); Jee-hyun Ahn, Seoul (KR)

(73) Assignees: SAMSUNG ELECTRONICS CO., LTD., Gyeonggi-do (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 501 days.

(21) Appl. No.: 13/953,893

(22) Filed: Jul. 30, 2013

(65) Prior Publication Data
US 2014/0227614 A1 Aug. 14, 2014

(30) Foreign Application Priority Data
Feb. 14, 2013 (KR) .................. 10-2013-0016059

(51) Int. Cl.
*H01M 10/0562* (2010.01)
*H01M 12/08* (2006.01)
(Continued)

(52) U.S. Cl.
CPC ............ *H01M 12/08* (2013.01); *C01G 25/006* (2013.01); *C04B 35/486* (2013.01);
(Continued)

(58) Field of Classification Search
CPC ............ H01M 10/0562; H01M 10/052; H01M 2300/0071; H01M 2300/0088; C01G 25/006; C04B 35/486; C04B 2235/764; C04B 2235/85; C04B 2235/3239; C04B 2235/3279; C04B 2235/3206; C04B 2235/3409; C04B 2235/6567; C04B 2235/3227

See application file for complete search history.

(56) References Cited

U.S. PATENT DOCUMENTS

| | | | |
|---|---|---|---|
| 7,556,655 B2 | 7/2009 | Dahn et al. | |
| 8,449,790 B2 * | 5/2013 | Narula et al. | 252/182.1 |

(Continued)

FOREIGN PATENT DOCUMENTS

| | | |
|---|---|---|
| EP | 2518795 | * 10/2012 |
| KR | 10-0478127 B1 | 3/2005 |

OTHER PUBLICATIONS

Kotobuki, M.; Munakata, H., Kanamura, K., Sato, Y., Yoshida, T., Compatability of Li7La3Zr2O12 Solid Electrolyte to All-Solid-State Battery Using Li Metal Anode, Journal of the Electrochemical Society, 157 (10) A1076-A1079 (2010).*

(Continued)

*Primary Examiner* — Ula C Ruddock
*Assistant Examiner* — Thomas Parsons
(74) *Attorney, Agent, or Firm* — Cantor Colburn LLP

(57) ABSTRACT

A solid ion conductor including a garnet oxide represented by Formula 1:

$$L_{5+x+2y}(D_y E_{3-y})(Me_z M_{2-z})O_d \qquad \text{Formula 1}$$

wherein
L is at least one of a monovalent cation or a divalent cation,
D is a monovalent cation,
E is a trivalent cation,
(Continued)

Me and M are each independently a trivalent, tetravalent, pentavalent, or a hexavalent cation, $0 < x+2y \leq 3$, $0 \leq y \leq 0.5$, $0 \leq z < 2$, and $0 < d \leq 12$, wherein O is partially or totally substituted with at least one of a pentavalent anion, a hexavalent anion, or a heptavalent anion; and $B_2O_3$.

17 Claims, 11 Drawing Sheets

(51) Int. Cl.
- *H01M 10/052* (2010.01)
- *C01G 25/00* (2006.01)
- *C04B 35/486* (2006.01)
- *C04B 35/626* (2006.01)

(52) U.S. Cl.
CPC ..... *C04B 35/62685* (2013.01); *H01M 10/052* (2013.01); *H01M 10/0562* (2013.01); *C01P 2002/72* (2013.01); *C01P 2004/03* (2013.01); *C01P 2006/40* (2013.01); *C04B 2235/3203* (2013.01); *C04B 2235/3206* (2013.01); *C04B 2235/3227* (2013.01); *C04B 2235/3239* (2013.01); *C04B 2235/3279* (2013.01); *C04B 2235/3409* (2013.01); *C04B 2235/6567* (2013.01); *C04B 2235/764* (2013.01); *C04B 2235/85* (2013.01); *H01M 2300/0071* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2011/0003212 A1 | 1/2011 | Sato et al. |
| 2011/0318650 A1* | 12/2011 | Zhang et al. ............. 429/320 |

OTHER PUBLICATIONS

Peng, Hongjian; Xie, Hui; Goodenough, Jonh B., Use of B2O3 to improve Li+—ion transport in LiTi2(PO4)3-based ceramics, Journal of Power Sources 197 (2012) 310-313.*

Murugan et al., "Fast Lithium Ion Conduction in Garnet-Type Li7La3Zr2O12", Angew. Chem. Int. Ed, 46, 2007, pp. 7778-7781.

Percival et al., "Cation ordering in Li containing garnets: synthesis and structural characterisation of the tetragonal system, Li7La3Sn2O12", The Royal Society of Chemistry 2009, pp. 5177-5181.

Thangadurai et al., "Li6ALa2Ta2O12 (A=Sr, Ba): Novel Garnet-Like Oxides for Fast Lithium Ion Conduction", Adv. Funct. Mater., 15, No. 1, Jan. 2005, pp. 107-112.

* cited by examiner

SOLID ION CONDUCTOR, SOLID ELECTROLYTE INCLUDING THE SAME, LITHIUM BATTERY INCLUDING THE SOLID ELECTROLYTE, AND METHOD OF MANUFACTURING THE SOLID ION CONDUCTOR

CROSS-REFERENCE TO RELATED APPLICATIONS

This application claims priority to and the benefit of Korean Patent Application No. 10-2013-0016059, filed on 14 Feb. 2013, and all the benefits accruing therefrom under 35 U.S.C. §119, the content of which is incorporated herein in its entirety by reference.

BACKGROUND

1. Field

The present disclosure relates to a solid ion conductor with high ionic conductivity, a solid electrolyte including the solid ion conductor, a lithium battery including the solid electrolyte, and a method of manufacturing the solid ion conductor.

2. Description of the Related Art

Lithium batteries have high voltage and energy density, and are used in various fields. For example, in electric vehicles, hybrid electric vehicles (HEVs) and plug-in hybrid electric vehicles (PHEVs), battery operation at high temperatures, charging or discharging a large amount of electricity, and a long period of battery use can be desirable.

In a lithium battery including a liquid electrolyte, i.e., an electrolyte prepared by dissolving a lithium salt in an organic solvent, the liquid electrolyte starts to decompose at a voltage of 2.5 V or more. Also, the liquid electrolyte has a high risk of leakage, fire, and explosion. Further, the liquid electrolyte can support the formation of dendrites, which can cause self-discharging and heating of a lithium battery.

An all-solid-state lithium battery including a lithium ion conductor as a solid electrolyte can have a higher stability than that of a lithium battery including a liquid electrolyte. The lithium ion conductor constituting the solid electrolyte is a single ion conductor in which only Li ions are migrated, and thus it has no risk of ignition, as compared to lithium batteries including a liquid electrolyte. Therefore, all-solid-state lithium batteries are suitable for use in electric vehicles, large-scale storage batteries, and the like.

The solid ion conductor desirably has high lithium ion conductivity, is chemically stable, and has a wide potential window, for use as a solid electrolyte for a lithium battery.

A garnet-type oxide, such as $Li_5La_3M_2O_{12}$ (M=Nb or Ta), is chemically stable and has a wide potential window, while it has a poor lithium ionic conductivity (e.g., approximately $\sim 10^{-6}$ Siemens per centimeter (S/cm)) at 25° C.

SUMMARY

Provided is a solid ion conductor with excellent lithium ion conductivity.

Provided is a solid electrolyte including the solid ion conductor.

Provided is a lithium battery including the solid ion conductor.

Provided is a method of manufacturing the solid ion conductor.

Additional aspects will be set forth in part in the description which follows and, in part, will be apparent from the description.

According to an aspect, a solid ion conductor includes a garnet oxide represented by Formula 1:

$$L_{5+x+2y}(D_y E_{3-y})(Me_z M_{2-z})O_d \quad \text{Formula 1}$$

wherein L may be at least one of a monovalent cation or a divalent cation,
D may be a monovalent cation,
E is a trivalent cation,
Me and M may be each independently a trivalent, tetravalent, pentavalent, or a hexavalent cation,
$0 < x+2y \le 3$, $0 \le y \le 0.5$, $0 \le z < 2$, and $0 < d \le 12$,
wherein O may be partially or totally substituted with at least one of a pentavalent anion, a hexavalent anion, or a heptavalent anion; and $B_2O_3$.

According to another aspect, a solid electrolyte including the solid ion conductor is provided.

According to another aspect, a lithium battery including a positive electrode includes a positive electrode active material; a negative electrode including a negative electrode active material; and an organic electrolyte, wherein at least one of the positive electrode, the negative electrode, and the organic electrolyte includes the solid ion conductor.

Also provided is a lithium air battery including: a positive electrode; a negative electrode; and a separator, wherein an ion conductive membrane comprises the solid ion conductor and is disposed on a surface of at least one of the positive electrode, the negative electrode, and the separator.

According to another aspect, disclosed is a method of manufacturing a solid ion conductor, the method including contacting precursors of a garnet oxide to form a precursor mixture, calcining the precursor mixture to form a calcined mixture; combining the calcined mixture and $B_2O_3$; and sintering the mixture of the calcined mixture and the $B_2O_3$ to manufacture the solid ion conductor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
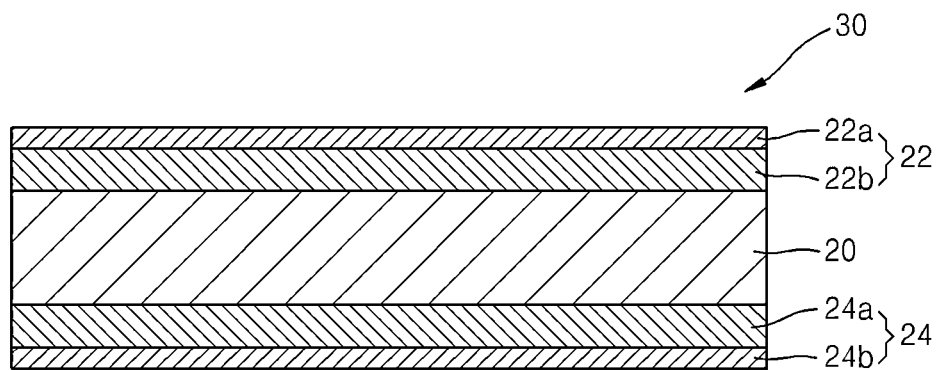
FIG. 1 is a diagram of an embodiment of an all-solid-state lithium battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

$Li_7La_3Zr_2O_{12}$ ("LLZ") has a bulk resistance at room temperature of about $6\times10^{-4}$ Scm$^{-1}$. However, and while not wanting to be bound by theory, it is believed that the lithium ion conductivity of LLZ is only a half of the bulk ionic conductivity of LLZ due to a high grain boundary resistance of LLZ.

Hereinafter, a solid ion conductor according to one or more exemplary embodiments, a solid electrolyte including the solid ion conductor, a lithium battery including the solid electrolyte, and methods of preparing the solid ion conductor will be described in detail.

According to an embodiment, a solid ion conductor includes a garnet-type oxide represented by Formula 1 below; and $B_2O_3$ as an additive.

$$L_{5+x+2y}(D_y,E_{3-y})(Me_z,M_{2-z})O_d \qquad \text{Formula 1}$$

In Formula 1, L is at least one of a monovalent cation and a divalent cation; D is a monovalent cation; E is a trivalent cation; Me and M are each independently a trivalent, tetravalent, pentavalent or hexavalent cation; $0<x+2y\leq3$, $0\leq y\leq0.5$, $0\leq z<2$, and $0<d\leq12$; and O may be partially or totally substituted with at least one of a pentavalent anion, a hexavalent anion, or a heptavalent anion.

The solid ion conductor may have an excellent ionic conductivity without changing a crystal structure of the garnet-type oxide by including $B_2O_3$ as an additive.

An amount of $B_2O_3$ in the solid ion conductor may be in a range of about 0.5 mole percent (mol %) about 10 mol %, based on a total moles of the garnet-type oxide. When the amount of $B_2O_3$ is within the range above, the ionic conductivity of the solid ion conductor may be improved without undesirably altering a crystal structure of the garnet-type oxide.

$B_2O_3$ may be present at a grain boundary of the garnet-type oxide.

In Formula 1, M may be Zr, Ta, Bi, Sb, or Nb, for example, Zr.

In Formula 1, E may be La, and M may be Zr.

In Formula 1, D may be K, Rb, or Cs.

When D is present in Formula 1, that is, when $0<y\leq0.5$, at least a part of trivalent cations present at the dodecahedral site may be substituted with a monovalent cation having a larger ionic radius than that of the trivalent cations, whereby the garnet-type oxide of Formula 1 has an increased lattice parameter and reduced activation energy. In addition, a monovalent cation having a smaller electronegativity than that of the trivalent cation may be substituted, and thus a distance between oxygen ions in the vicinity of lithium ions present at the tetrahedral and/or octahedral site(s) may vary. While not wanting to be bound by theory, it is understood that such substitution may provide for facilitated migration of the lithium ions.

In Formula 1, Me may be, for example, at least one of tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), zinc (Zn), or chromium (Cr).

In Formula 1, x and y may satisfy, for example, $0<x+2y\leq1$, $1<x+2y\leq2$, or $2<x+2y\leq2.5$.

An ionic conductivity of the solid ion conductor may be $2.0\times10^{-4}$ Siemens per centimeter (S/cm) or more at 25° C. For example, an ionic conductivity of the solid ion conductor may be $4.0\times10^{-4}$ S/cm or more at 25° C., for example, $7.5\times10^{-4}$ S/cm or more at 25° C. An overall resistance of the solid ion conductors may be in a range of about 0 kiloOhms (kΩ) to about 200 kΩ.

In the solid ion conductor, the garnet-type oxide may have an activation energy that is less than 0.34 electron volts (eV) at a temperature of about −10° C. to about 100° C. For example, the garnet-type oxide of the solid ion conductor may have an activation energy of 0.30 eV or less at a temperature of about −10° C. to about 100° C. For example, the garnet-type oxide of the solid ion conductor may have an activation energy of 0.29 eV or less at a temperature of about −10° C. to about 100° C. As the activation energy decreases, the ionic conductivity of the solid ion conductor according to temperature becomes insensitive to temperature, and thus the solid ion conductor may have good low-temperature properties.

According to an embodiment, a solid electrolyte includes the solid ion conductor including the garnet-type oxide of Formula 1; and $B_2O_3$ as an additive. While not wanting to be bound by theory, it is understood that the solid electrolyte has a high ionic conductivity due to a decrease in an interfacial resistance, and thus may be used as an electrolyte for a battery, such as a lithium battery and the like.

The solid electrolyte may further include another solid ion conductor, in addition to the solid ion conductor described above. For example, an additional solid ion conductor may be a sulfide-based conductor or an oxide-based conductor. Non-limiting examples of the additional solid ion conductor include $Li_3N$, $Li_{1+x}Zr_2Si_xP_{3-x}O_{12}$ where $0<x<3$, Lithium Super Ionic Conductor ("LISICON"), $Li_{3-y}PO_{4-x}N_x$, $0<y<3$, $0<x<4$ ("LIPON"), Thio-LISICON (e.g., $Li_{3.25}Ge_{0.25}P_{0.75}S_4$), $Li_2S$, $Li_2S-P_2S_5$, $Li_2S-SiS_2$, $Li_2S-GeS_2$, $Li_2S-B_2S_5$, $Li_2S-Al_2S_5$, and $Li_2O-Al_2O_3-TiO_2-P_2O_5$ ("LATP"). Also, any other suitable solid ion conductor known in the art may be used.

The solid electrolyte may be in the form of powder or a solid. The solid form may be, for example, a pellet, a thin film, or the like, but is not limited thereto. The solid electrolyte may have various forms according to the use thereof.

According to another embodiment, an all-solid-state lithium battery includes the solid ion conductor including the garnet-type oxide of Formula 1; and $B_2O_3$ as an additive, as a solid electrolyte.

Since the all-solid-state lithium battery includes the solid electrolyte having an improved ionic conductivity, the all-solid-state lithium battery has a reduced interface resistance, and thus polarization thereof may decrease. Therefore, the all-solid-state lithium battery may have an increased energy efficiency.

The all-solid-state lithium battery may include a positive electrode, a negative electrode, and the solid electrolyte disposed between the positive electrode and the negative electrode. Also, the all-solid-state lithium battery may further include polymer electrolyte membranes each between the positive electrode and the solid electrolyte and between the negative electrode and the solid electrolyte. Due to the inclusion of the polymer electrolyte membrane, adhesion between the solid electrolyte and the positive electrode and/or the negative electrode is improved, and thus, battery characteristics may be improved. The polymer electrolyte membrane may be impregnated in an organic electrolytic solution including a lithium salt and an organic solvent.

The all-solid-state lithium battery may be prepared as follows:

First, a solid ion conductor including the garnet-type oxide of Formula 1 and $B_2O_3$ as an additive is prepared to obtain a solid electrolyte.

Next, a positive electrode is prepared.

The positive electrode may be prepared by forming a positive active material layer including a positive active material on a current collector. The positive active material layer may be prepared using a vapor-state method or a solid-state method. Examples of the vapor-state method include pulse laser deposition ("PLD"), sputtering deposition, and chemical vapor deposition ("CVD"). However, the vapor-state method is not limited thereto, and any vapor state method known in the art may be used. Examples of the solid-state method include a sintering method, a sol-gel method, a doctor-blade method, screen printing, slurry casting, and a powder compression. However, the solid-state method is not limited thereto, and any solid-state method known in the art may be used.

The positive active material may be any suitable material for a lithium battery. For example, the positive active material may be a lithium transition metal oxide, a transition metal sulfide, or the like.

For example, the positive active material may include one or more composite oxides of lithium and a metal of cobalt, manganese, nickel, or a combination thereof. For example, the positive active material may be a compound represented by any one of the Formulas: $Li_aA_{1-b}B_bD_2$ where $0.90\leq a\leq1.8$ and $0\leq b\leq0.5$; $Li_aE_{1-b}B_bO_{2-c}D_c$ where $0.90\leq a\leq1.8$, $0\leq b\leq0.5$, and $0\leq c\leq0.05$; $LiE_{2-b}B_bO_{4-c}D_c$ where $0\leq b\leq0.5$ and $0\leq c\leq0.05$; $Li_aNi_{1-b-c}Co_bB_cD_\alpha$ where $0.90\leq a\leq1.8$, $0\leq b\leq0.5$, $0\leq c\leq0.05$, and $0<\alpha\leq2$; $Li_aNi_{1-b-c}Co_bB_cO_{2-\alpha}F_\alpha$ where $0.90\leq a\leq1.8$, $0\leq b\leq0.5$, $0\leq c\leq0.05$, and $0<\alpha\leq2$; $Li_aNi_{1-b-c}Co_bB_cO_{2-\alpha}F_\alpha$ where $0.90\leq a\leq1.8$, $0\leq b\leq0.5$, $0\leq c\leq0.05$, and $0<\alpha<2$; $Li_aNi_{1-b-c}Mn_bB_cD_\alpha$ where $0.90\leq a\leq1.8$, $0\leq b\leq0.5$, $0\leq c\leq0.05$, and $0<a<2$; $Li_aNi_{1-b-c}Mn_bB_cO_{2-\alpha}F_\alpha$ where $0.90\leq a\leq1.8$, $0\leq b\leq0.5$, $0\leq c\leq0.05$, and $0<a$ 2; $Li_aNi_{1-b-c}Mn_bB_cO_{2-\alpha}F_\alpha$ where $0.90\leq a\leq1.8$, $0\leq b\leq0.5$, $0\leq c\leq0.05$, and $0<\alpha<2$; $Li_aNi_bE_cG_dO_2$ where $0.90\leq a\leq1.8$, $0\leq b\leq0.9$, $0\leq c\leq0.5$, and $0.001$ d $0.1$; $Li_aNi_bCo_cMn_dGeO_2$ where $0.90\leq a\leq1.8$, $0\leq b\leq0.9$, $0\leq c\leq0.5$, $0\leq d\leq0.5$, and $0.001\leq e\leq0.1$; $Li_aNiG_bO_2$ where $0.90\leq a\leq1.8$ and $0.001\leq b\leq0.1$; $Li_aCoG_bO_2$ where $0.90\leq a\leq1.8$ and $0.001\leq b\leq0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_2$; $LiIO_2$; $LiNiVO_4$; $Li_{(3-f)}J_2(PO_4)_3$ $(0 \leq f \leq 2)$; or $Li_{(3-f)}Fe_2(PO_4)_3$ where $0 \leq f \leq 2$; and $LiFePO_4$.

In the formulas above, A is Ni, Co, Mn, or a combination thereof; B is Al, Ni, Co, Mn, Cr, Fe, Mg, Sr, V, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

Examples of the positive active material include $LiCoO_2$, $LiMn_xO_{2x}$ where $x=1$ or 2, $LiNi_{1-x}Mn_xO_{2x}$ where $0<x<1$, $Ni_{1-x-y}Co_xMn_yO_2$ where $0 \leq x \leq 0.5$ and $0 \leq y \leq 0.5$, $LiFePO_4$, $TiS_2$, $FeS_2$, $TiS_3$, or $FeS_3$.

The positive active material layer may further include the solid ion conductor described above, in addition to the positive active material. While not wanting to be bound by theory, it is understood that due to the inclusion of the solid ion conductor, an interfacial resistance between the positive active material layer and a layer of the solid electrolyte that contacts the positive electrode may be reduced, ionic conductivity in the positive active material layer may be improved, and thermal stability of the positive electrode may be improved.

In addition, the positive active material layer may further include a conductive material and a binder. Any suitable conductive material and binder that may be used in the art may be used.

Next, a negative electrode is prepared.

The negative electrode may be prepared using the same method used to prepare the positive electrode, except that a negative active material is used instead of the positive active material. The negative electrode may also further include the solid ion conductor described above in a negative active material layer.

A negative active material may be any suitable material for a lithium battery. For example, the negative active material may be at least one of lithium metal, a metal that is alloyable with lithium, a transition metal oxide, a non-transition metal oxide, or a carbonaceous material.

Examples of the metal that is alloyable with lithium include Si; Sn; Al; Ge; Pb; Bi; Sb; an Si—Y alloy where Y is an alkali metal, an alkali earth metal, a Group 13 element, a Group 14 element, a transition metal, a rare-earth element, or a combination thereof other than Si; and an Sn—Y alloy where Y is an alkali metal, alkali earth metal, a Group 13 element, a Group 14 element, a transition metal, a rare-earth element, or a combination thereof other than Sn. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Non-limiting examples of the transition metal oxide include lithium titanium oxide, vanadium oxide, and lithium vanadium oxide.

For example, the non-transition metal oxide may be $SnO_2$ or $SiO_x$ where $0<x \leq 2$.

Examples of the carbonaceous material include crystalline carbon, amorphous carbon, and mixtures thereof. Examples of the crystalline carbon include natural graphite and artificial graphite, each of which has an amorphous shape, a plate shape, a flake shape, a spherical shape, or a fiber shape. Examples of the amorphous carbon include soft carbon (low-temperature calcined carbon), hard carbon, mesophase pitch carbide, and calcined coke.

FIG. 1 is a diagram of an embodiment of an all-solid-state lithium battery. Referring to FIG. 1, the all-solid-state lithium battery 30 includes a solid electrolyte layer 20, a positive electrode 22 disposed on a top surface of the solid electrolyte layer 20, and a negative electrode 24 disposed on a bottom surface of the solid electrolyte layer 20. The positive electrode 22 includes a positive active material layer 22b that contacts the solid electrolyte layer 20 and a positive current collector 22a that contacts the positive active material layer 22b. The negative electrode 24 includes a negative active material layer 24a that contacts the solid electrolyte layer 20 and a negative current collector 24b that contacts the negative active material layer 24a. The all-solid-state lithium battery 30 may be manufactured using a solid-state method, a vapor-state method, or a combination thereof. For example, the positive active material layer 22b and the negative active material layer 24a may be disposed respectively on opposite sides of the solid electrolyte layer 20 using a vapor-state method, a solid-state method, or a combination thereof, and then the positive and negative current collectors 22a and 24b may be respectively disposed on the positive active material layer 22b and the negative active material layer 24a, thereby completing the manufacture of the all-solid-state lithium battery 30. Alternatively, the negative active material layer 24a, the solid electrolyte layer 20, the positive active material layer 22b, and the positive current collector 22a may be sequentially stacked on the negative current collector 24b using a vapor-state method, a solid-state method, or a combination thereof, thereby completing the manufacture of the all-solid-state lithium battery 30.

According to another embodiment, a lithium battery includes: a positive electrode including a positive active material; a negative electrode including a negative active material; and an organic electrolytic solution, wherein at least one of the positive electrode, the negative electrode, and the organic electrolytic solution includes the solid ion conductor including the garnet-type oxide of Formula 1; and $B_2O_3$ as an additive.

Due to the inclusion of the solid ion conductor, the lithium battery may have an improved lifetime characteristic and thermal stability.

In the lithium battery, the positive electrode may include the solid ion conductor. The amount of the solid ion conductor in the positive electrode may be in a range of more than about 0 to about 50 weight percent (wt %), based on a total weight of the positive active material and the solid ion conductor. For example, the amount of the solid ion conductor in the positive electrode may be in a range of more than about 0 to about 30 wt %, based on the total weight of the positive active material and the solid ion conductor. For example, the amount of the solid ion conductor in the positive electrode may be in a range of more than about 0 to about 10 wt %, based on the total weight of the positive active material and the solid ion conductor. When the amount of the solid ion conductor in the positive electrode is within the range above, the solid ion conductor may effectively or substantially prevent a reduction in a capacity of the lithium battery. In order to more easily adhere solid ion conductor particles onto surfaces of positive active material particles in the positive electrode, a particle diameter of the solid ion conductor may be smaller than a particle diameter of the positive active material particles.

Also, the negative electrode of the lithium battery may include the solid ion conductor. The amount of the solid ion conductor in the negative electrode may be in a range of more than about 0 to about 50 wt %, based on a total weight of the negative active material and the solid ion conductor. For example, the amount of the solid ion conductor in the negative electrode may be in a range of more than about 0 to about 30 wt %, based on the total weight of the negative active material and the solid ion conductor. For example, the amount of the solid ion conductor in the negative electrode may be in a range of more than about 0 to about 10 wt %, based on the total weight of the negative active material and the solid ion conductor. When the amount of the solid ion conductor in the negative electrode is too large, a capacity of the lithium battery may be reduced. In order to more easily adhere solid ion conductor particles onto surfaces of negative active material particles in the negative electrode, a particle diameter of the solid ion conductor may be smaller than a particle diameter of the negative active material particles.

In addition, in the lithium battery, the organic electrolytic solution and/or a separator may include the solid ion conductor.

In another embodiment, a solid ion conductor film may be disposed on a surface of at least one of the positive electrode and the negative electrode that contacts the organic electrolyte. For example, the solid ion conductor film may be disposed on a surface of a positive active material layer and/or a negative active material layer that contacts the organic electrolytic solution. The solid ion conductor film may suppress a side reaction between the organic electrolytic solution and the positive active material layer and/or the negative active material layer and may also suppress the formation of a dendrite.

The lithium battery may be manufactured as follows:

First, a positive electrode plate is prepared.

A positive active material, a conductive material, a binder, and a solvent are combined together to prepare a positive active material composition. The positive active material composition may be coated directly on an Al current collector and dried, thereby completing the manufacture of the positive electrode plate. Alternatively, the positive active material composition may be cast on a separate support and peeled off from the support to obtain a film, and then the film is laminated on the Al current collector, thereby completing the manufacture of the positive electrode plate. In another embodiment, the positive active material composition may be prepared in the form of an electrode ink including an excess amount of a solvent and printed on a support by inkjet printing or Gravure printing, thereby completing the manufacture of the positive electrode plate. The printing method is not limited to the above examples, and any suitable method that may be used in general coating and printing may be used.

The positive active material composition may further include the solid ion conductor. The amount of the solid ion conductor in the positive active material composition may be 50 wt % or less of the total weight of the positive active material and the solid ion conductor.

The positive active material used in the positive electrode may be the same as that used in the all-solid-state lithium battery described above.

The conductive material may be, for example, carbon black. Examples of the binder include a vinylidene fluoride/hexafluoropropylene copolymer, polyvinylidene fluoride, polyacrylonitrile, polymethylmethacrylate, polytetrafluoroethylene, polyimide, polyamideimide, a styrene-butadiene rubber-based polymer, acrylate-based rubber, and sodium carboxymethylcellulose. The solvent may be, for example, N-methylpyrrolidone, acetone, water, or the like.

Suitable amounts of the positive active material, the conductive material, the binder, and the solvent are amounts that are used in a general lithium battery.

Also, a solid ion conductor coating layer may be further formed on a positive electrode active material layer of the positive electrode plate. The solid ion conductor coating layer may be formed using any one of various methods known in the art, such as a vapor-state method, a solid-state reaction method, or the like. For example, the solid ion conductor coating layer may be formed by coating and drying a slurry including the solid ion conductor.

Next, a negative electrode plate is prepared.

Similarly, a negative active material, a conductive material, a binder, and a solvent are combined together to prepare a negative active material composition. The negative active material composition may be coated directly on a Cu current collector and dried, thereby completing the manufacture of the negative electrode plate. Alternatively, the negative active material composition may be cast on a separate support and peeled off from the support to obtain a negative active material film, and then the negative active material film may be laminated on the Cu current collector, thereby completing the manufacture of the negative electrode plate. In another embodiment, the negative active material composition is prepared in the form of an electrode ink including an excess amount of a solvent and printed on a support by inkjet printing or Gravure printing, thereby completing the manufacture of the negative electrode plate. The printing method is not limited to the above examples, and any suitable method that may be used in general coating and printing may be used.

The negative active material composition may further include the solid ion conductor. The amount of the solid ion conductor in the negative active material composition may be 50 wt % or less of the total weight of the negative active material and the solid ion conductor.

The negative active material used in the negative electrode may be the same as that used in the all-solid-state lithium battery described above.

The conductive material, the binder, and the solvent may be the same as those used in the manufacture of the positive electrode plate. Suitable amounts of the negative active material, the conductive material, the binder, and the solvent are amounts that are used in a general lithium battery.

A plasticizer may be added to the positive active material composition and the negative active material composition, and thus pores may be formed in the positive and negative electrode plates.

Next, a separator is prepared.

The positive electrode and the negative electrode may be separated by the separator, and any separator that may be generally used in a lithium battery may be used. In one embodiment, the separator has low resistance to migration of ions in an electrolyte and has a high electrolyte-retaining ability. Examples of the separator include glass fiber, polyester, Teflon®, polyethylene, polypropylene, polytetrafluoroethylene ("PTFE"), and combinations thereof, each of which may be in the form of a non-woven or woven fabric. In particular, a windable separator including polyethylene, polypropylene, or the like may be used in a lithium ion battery. A separator capable of retaining a large amount of an organic electrolytic solution may be used in a lithium-ion polymer battery.

The separator may be prepared as follows: A polymer resin, a filler, and a solvent are mixed to prepare a separator composition. The separator composition is directly coated on an electrode and then dried to form a separator film. Alternatively, the separator composition may be cast on a separate support, dried, detached from a separator support, and finally laminated on an upper portion of the electrode, thereby forming a separator film.

The polymer resin is not particularly limited, and any polymer resin that is used as a binder of the positive and negative electrode plates may be used. Examples of the polymer resin include a vinylidenefluoride/hexafluoropropylene copolymer, polyvinylidenefluoride, polyacrylonitrile, polymethylmethacrylate, and mixtures thereof. A vinylidenefluoride/hexafluoropropylene copolymer including about 8 to about 25 wt % of hexafluoropropylene may be suitably used.

Next, an electrolyte is prepared. The electrolyte may be a liquid electrolyte including an organic electrolyte solution. The organic electrolyte solution may be prepared by dissolving a lithium salt in an organic solvent.

Any suitable organic solvent used in the art may be used. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and a combination thereof.

Any suitable lithium salt used in the art may be used. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are different from each other and each independently are an integer of 1 to 20, LiCl, LiI, and a combination thereof.

The amount of the lithium salt may be in a range of about 0.01 molar (M) to about 2.0 M, but is not limited thereto. The amount of the lithium salt may be appropriately selected within the range that provides an improved battery performance.

The organic electrolytic solution may further include a flame retardant material such as a phosphorus-based flame retardant material or a halogen-based flame retardant material.

Figure 2:
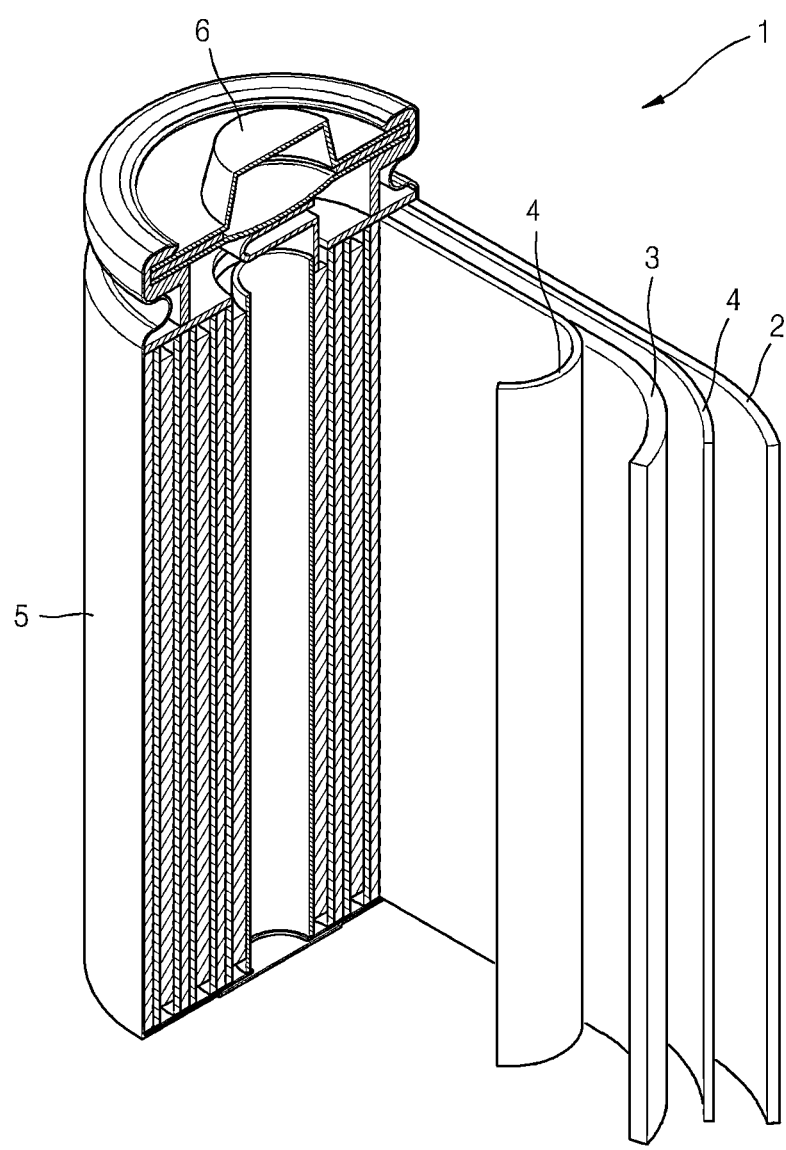
FIG. 2 is a diagram of another embodiment of a lithium battery.

FIG. 2 is a diagram of a lithium battery 1 according to another embodiment. Referring to FIG. 2, the lithium battery 1 includes a positive electrode 3, a negative electrode 2, and a separator 4. The positive electrode 3, the negative electrode 2, and the separator 4 are wound or folded and then accommodated in a battery case 5. Subsequently, the organic electrolyte is injected into the battery case 5 and the battery case 5 is sealed by a cap assembly 6, thereby completing the manufacture of the lithium battery 1. The battery case 5 may be in the form of a cylinder, a rectangle, or a thin film. For example, the lithium battery 1 may be a large thin-film-type battery. The lithium battery 1 may be a lithium ion battery.

A separator may be disposed between the positive electrode and the negative electrode to form a battery assembly. A plurality of battery assemblies may be stacked in a bi-cell structure and impregnated with an organic electrolytic solution, and the resultant structure is accommodated in a pouch and sealed, thereby completing the manufacture of a lithium ion polymer battery.

In addition, the battery assemblies may be stacked on each other to form a battery pack, and the battery pack may be used in high capacity and high-performance devices, such as a notebook computer, a smart phone, an electric vehicle, and the like.

Since the lithium battery has high thermal stability and high-rate characteristics, the lithium battery is suitable for use in an electric vehicle ("EV"). For example, the lithium battery may be used in a hybrid vehicle such as a plug-in hybrid electric vehicle ("PHEV"). In addition, the lithium battery may be used in applications such as electricity storage systems that store a large amount of electricity, and the like.

According to another embodiment, a lithium air battery includes the solid ion conductor including the garnet-type oxide of Formula 1; and $B_2O_3$ as an additive. Due to the inclusion of the solid ion conductor, the lithium air battery may have an improved stability and energy efficiency.

The lithium air battery includes a positive electrode, a negative electrode, and a separator, in which an ion conductive membrane including the solid ion conductor may be disposed on a surface of at least one of the positive electrode, the negative electrode, and the separator.

In an embodiment, the ion conductive membrane including the solid ion conductor may be disposed on a surface of the negative electrode facing the positive electrode, and thus a side reaction between the negative electrode and an electrolyte may be suppressed, resulting in an improved lifetime of the lithium air battery.

In addition, the ion conductive membrane may be disposed on at least a surface of the separator of the lithium air battery. Also, the ion conductive membrane may be disposed on a surface of the positive electrode facing the negative electrode.

The lithium air battery including the ion conductive membrane may be prepared as follows:

First, a positive electrode, a negative electrode capable of intercalating and deintercalating lithium, and a separator are prepared. An ion conductive membrane including the solid ion conductor may be disposed on a surface of at least one of the positive electrode, the negative electrode, and the separator.

Next, the negative electrode may be mounted on one side of a case, and the positive electrode with the separator may be mounted on the other side of the case, opposite to the negative electrode. The separator may be disposed on the side of the positive electrode, facing the negative electrode. Subsequently, an electrolyte may be injected between the positive electrode and the negative electrode, a porous current collector is disposed on the positive electrode, and a pressing member that allows air to reach the positive electrode applies pressure to fix the cell, thereby completing the manufacture of the lithium air battery. An ion conductive membrane including the solid ion conductor may be further disposed on one surface of the negative electrode.

The case may be divided into upper and lower parts that contact the negative and positive electrodes, respectively. An insulating resin may be disposed between the upper and lower parts to electrically insulate the positive and negative electrodes from each other.

The positive electrode may be manufactured as follows: A catalyst for oxidation/reduction of oxygen, a conductive material, and a binder are combined and an appropriate solvent is added thereto to prepare a positive electrode slurry. The positive electrode slurry is coated on a surface of a current collector and the coated current collector is then dried, optionally followed by compression-molding to improve electrode density, thereby completing the manufacture of the positive electrode.

The conductive material may be porous. Thus, any suitable positive electrode material with suitable porosity and conductivity may be used without limitation. For example, porous carbon-based materials may be used. Examples of a carbon-based material include carbon black, graphite, graphene, activated carbon, carbon fibers, and a combination thereof. Metallic conductive materials, including metal fibers and metal meshes, may be used. Metal powders including copper, silver, nickel, aluminum, and the like may be used. Organic conductive materials, such as polyphenylene derivatives, may be used. The above-described conductive materials may be used alone or in combination.

Examples of the catalyst for oxidation/reduction of oxygen include a precious metal-based catalyst such as platinum, gold, silver, palladium, ruthenium, rhodium, and osmium; oxide-based catalysts such as a manganese oxide, an iron oxide, a cobalt oxide, and a nickel oxide; and organometallic catalysts such as cobalt phthalocyanine. However, the catalyst is not limited to the above examples and any suitable catalyst for oxidation/reduction of oxygen that is known in the art may be used. The catalyst for oxidation/reduction of oxygen may be omitted if desired.

The catalyst may be supported on a catalyst support. The catalyst support may be an oxide, zeolite, clay-based minerals, or carbon. The oxide may be at least one oxide of alumina, silica, zirconium oxide, or titanium dioxide or may be an oxide including at least one metal of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), or tungsten (W). Examples of the carbon include carbon black such as Ketjen Black, acetylene black, channel black, and lamp black; graphite such as natural graphite, artificial graphite, and expandable graphite; activated carbon; and carbon fibers. However, the catalyst support is not limited to the above examples and any suitable catalyst support known in the art may be used.

The binder may include a thermoplastic resin or a thermosetting resin. Examples of the binder include, but are not limited to, polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer. The binder materials listed may be used alone or in combination. However, any binder available in the art may be used. The binder may not be used, if desired.

A porous body in a network or mesh form may be used as the current collector to facilitate diffusion of oxygen. A porous metal plate made of, for example, stainless steel, nickel, or aluminum may be used. Materials for the current collector are not particularly limited, and any material for current collectors known in the art may be used. The current collector may be coated with an anti-oxidative metal or alloy to prevent oxidation.

In the lithium air battery, a material for the negative electrode capable of intercalating and deintercalating lithium may be Li metal, a Li metal-based alloy, or a material capable of intercalating and deintercalating lithium, but is not limited thereto. However, for a negative electrode, any suitable material which may be used in the art that includes lithium or is capable of intercalating and deintercalating lithium may be used. The negative electrode may determine the capacity of the lithium air battery and thus the negative electrode may be, for example, lithium metal. For example, the lithium metal-based alloy may be an alloy of lithium with aluminum, tin, magnesium, indium, calcium, titanium, or vanadium. The type of the negative electrode is not particularly limited. For example, the negative electrode may be in the form of a sheet.

The separator disposed between the positive electrode and the negative electrode is not particularly limited as long as it has a composition that can withstand service conditions of the lithium air battery. Examples of the separator include polymer nonwoven fabrics such as polypropylene nonwoven fabrics and polyphenylene sulfide nonwoven fabrics; and porous films composed of olefin resins such as polyethylene and polypropylene. These materials may also be used in combination. The separator may be omitted if desired.

The electrolyte may be an organic electrolyte or an aqueous electrolyte.

The organic electrolyte may include an aprotic solvent. The aprotic solvent may comprise a carbonate-based solvent, an ester-based solvent, an ether-based solvent, a ketone-based solvent, an amine-based solvent, a phosphine-based solvent, or a combination thereof. Examples of the carbonate-based solvent include dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate ("PC"), and butylene carbonate ("BC"). Examples of the ester-based solvent include methyl acetate, ethyl acetate, n-propyl acetate, dimethylacetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyltetrahydrofuran, and tetrahydrofuran. For example, the ketone-based solvent may be cyclohexanone. Examples of the amine-based solvent include triethylamine and triphenylamine. For example, the phosphine-based solvent may be triethylphosphine. However, the aprotic solvent is not limited to the above examples, and any suitable aprotic solvent known in the art may be used.

Examples of the aprotic solvent include: nitriles such as R—CN where R is a linear, branched, or cyclic $C_2$ to $C_{20}$ hydrocarbon group and has a double-bond aromatic ring or ether bond; amides such as dimethylformamide; dioxolanes such as 1,3-dioxolane; and sulfolanes.

The aprotic solvent may be used alone or in combination. When the aprotic solvents are used in combination, a ratio thereof may be appropriately selected according to the desired performance of the battery to be manufactured and can be determined by one of skill in the art without undue experimentation.

The organic electrolyte may include an ionic liquid. Examples of the ionic liquid include compounds containing cations such as linear or branched, substituted ammonium, imidazolium, pyrrolidinium, and piperidinium, and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The organic electrolyte may include at least one of an alkali metal salt and an alkali earth metal salt. The at least one of the alkali metal salt and the alkali earth metal salt may be dissolved in an organic solvent and acts as a source of at least one of the alkali metal ions and the alkali earth metal ions in the lithium air battery. The salt may facilitate migration of the alkali metal ions and/or alkali earth metal ions between the positive and negative electrodes.

For example, cations of the alkali metal salt and/or the alkali earth metal salt may include lithium ions, sodium ions, magnesium ions, potassium ions, calcium ions, rubidium ions, strontium ions, cesium ions, barium ions, and the like.

Anions of the alkali metal salt and/or alkali earth metal salt in the organic electrolyte may be at least one anion of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ where x is a natural number, $(C_xF_{2x+1}SO_2)(C_yF_{2y+1}SO_2)N^-$ where x and y are natural numbers, or a halide.

For example, the alkali metal salt and/or alkali earth metal salt may be, but are/is not limited to, at least one compound of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiF, LiBr, LiCl, LiI, or $LiB(C_2O_4)_2$ (lithium bis(oxalato)borate, "LiBOB"). Any suitable alkali metal salts and/or alkali earth metal salts available in the art may be used.

In the organic electrolyte, the amount of the at least one of the alkali metal salt and the alkali earth metal salt may be from about 100 millimolar (mM) to about 10 M, for example, from about 500 mM to about 2 M. The amount of the at least one of the alkali metal salt and the alkali earth metal salt is not particularly limited, as long as the organic electrolyte may effectively transfer lithium ions and/or electrons during charging and discharging.

In addition, an ion conductive membrane including the solid ion conductor according to an embodiment may be disposed between the negative electrode and the electrolyte. The ion conductive membrane may serve as a protective layer preventing water contained in an aqueous electrolyte and impurities, such as oxygen, from directly reacting with lithium contained in the negative electrode.

The ion conductive membrane may further include a lithium ion conductive glass, lithium ion conductive crystal, or a combination thereof. For example, the lithium ion conductive crystal may be $Li_{1+x+y}(Al, Ga)_x(Ti, Ge)_{2-x}Si_yP_{3-y}O_{12}$ where $0 \le x \le 1$ and $0 \le y \le 1$, for example, $0 \le x \le 0.4$ and $0 \le y \le 0.6$, for example, $0.1 \le x \le 0.3$, and $0.1 \le y \le 0.4$. Examples of the lithium ion conductive glass-ceramic include lithium-aluminum-germanium-phosphate ("LAGP"), lithium-aluminum-titanium-phosphate ("LATP"), lithium-aluminum-titanium-silicon-phosphate ("LATSP"), and the like.

In some embodiments, the ion conductive membrane may further include a polymer solid electrolyte. The polymer solid electrolyte may be polyethylene oxide doped with a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

The ion conductive membrane may further include an inorganic solid electrolyte. Examples of the inorganic solid electrolyte include $Cu_3N$, $Li_3N$, LiPON, and the like.

The lithium air battery may be either a lithium primary battery or a lithium secondary battery and may be used as a large-scale battery for electric vehicles. The lithium air battery may have various shapes, and in some embodiments, may have a coin, button, sheet, stack, cylinder, plane, or horn shape.

Figure 3:
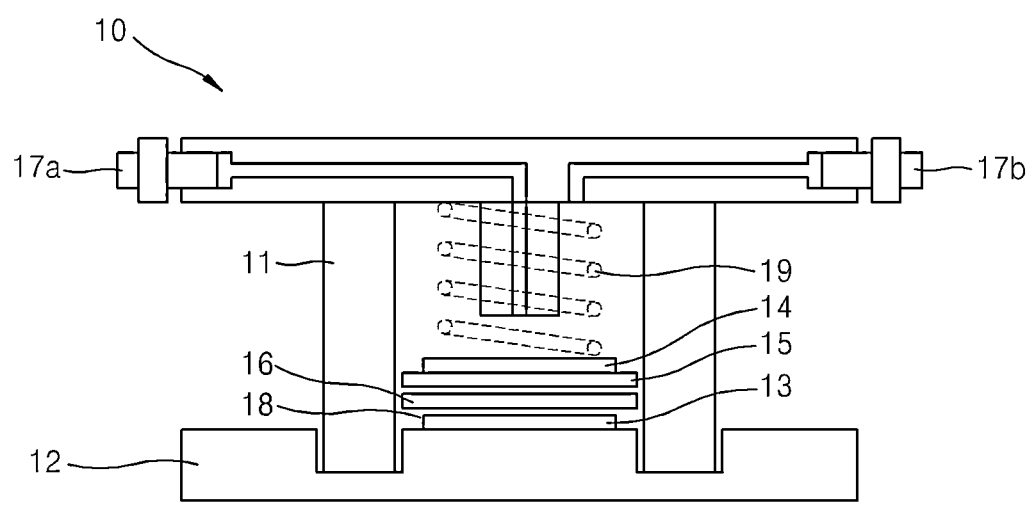
FIG. 3 is a diagram of an embodiment of a lithium air battery.

FIG. 3 is a diagram illustrating a lithium air battery 10 according to another embodiment. As shown in FIG. 3, the lithium air battery 10 includes a positive electrode 15 using oxygen as an active material and disposed on a first current collector 14, a negative electrode 13 including lithium and contacting a second current collector 12, an organic electrolyte 18 disposed between the positive electrode 15 and the negative electrode 13, and a separator 16 disposed on one surface of the positive electrode 15. An ion conductive membrane (not shown) according to an embodiment may be disposed on one surface of the negative electrode 13. The first current collector 14, which is porous, may serve as a gas diffusion layer. Also, a pressing member 19 that allows air to reach the positive electrode 15 may be disposed on the first current collector 14. A case 11 formed of an insulating resin is disposed between the positive electrode 15 and the negative electrode 13 to electrically insulate the positive electrode 15 and the negative electrode 13. Air is supplied to an air inlet 17a and exhausted via an air outlet 17b.

As used herein, the term "air" is not limited to atmospheric air, and may refer to a combination of gases including oxygen, or pure oxygen gas. This broad definition of "air" also applies to other terms including "air battery" and "air electrode."

According to another embodiment, a method of manufacturing a solid ion conductor includes: contacting precursors of a garnet-type oxide to form a precursor mixture; calcining the precursor mixture to form a calcined mixture; combining the calcined mixture and $B_2O_3$; and sintering the mixture of the calcined mixture and the $B_2O_3$ to manufacture the solid ion conductor.

While not wanting to be bound by theory, it is understood that when the method according to an embodiment is used, a solid ion conductor with a high ionic conductivity may be prepared at a low sintering temperature since $B_2O_3$, which is used as a sintering aid, is present at a grain boundary and the crystalline structure of the garnet-type oxide is maintained. While not wanting to be bound by theory, it is understood that this is because an interfacial resistance is reduced as $B_2O_3$, as a sintering aid, is sintered together with oxides with high melting points, lowering the melting points of the oxides and enabling liquid-phase sintering, and thus the garnet-type oxide may be more easily melted and formed as a pellet at a low temperature.

The garnet-type oxide precursors are precursors including metals that are included in the garnet-type oxide of Formula 1, and any suitable precursor available in the art may be used. For example, the garnet-type oxide precursors may include an oxide, carbonate, or nitride of a metal, or an organic polymer.

In the method according to an embodiment, the calcining of the garnet-type oxide precursor mixture may be performed at a temperature in a range of about 800° C. to about 1250° C. for about 2 hours to about 40 hours.

Then, a $B_2O_3$ powder is combined with the product of the calcining of the garnet-type oxide precursor mixture. Here, an amount of the $B_2O_3$ powder may be selected to provide an amount of about 0.5 mole percent (mol %) to about 10 mol % of $B_2O_3$ in the solid ion conductor, as the final product, based on a total moles of the garnet-type oxide.

The sintering of the mixture may be performed at a temperature in a range of about 800° C. to about 1250° C. for about 2 hours to about 40 hours.

When the sintering is performed at the above temperature range for the above time period, sintering reactivity may be sufficient, and phase decomposition and volatilization of lithium may be prevented.

In the preparation method, the mixing of the garnet-type oxide precursors of the solid ion conductor may be performed using a ball mill.

The solid ion conductor prepared using the preparation method may have various forms, such as powder, a thin film, a pellet, and the like, and may be appropriately selected according to the use thereof.

An embodiment will now be described more fully with reference to the following examples. However, these examples are provided only for illustrative purposes and are not intended to limit the scope.

Preparation of Solid Ion Conductor

Example 1

Preparation of $Li_7La_3Zr_2O_{12}$ Added with $B_2O_3$ $Li_2CO_3$ as an Li precursor, $La_2O_3$ as an La precursor, and $ZrO_2$ as a Zr precursor, which were used as starting materials, were stoichiometrically mixed together to obtain $Li_7La_3Zr_2O_{12}$.

The mixture dispersed in 2-propanol was pulverized by using a planetary ball mill (400 rpm, zirconia balls) for 24 hours. The pulverized mixed powder was dried at a temperature of 80° C. The resultant was put in a zirconia crucible and calcined at 900° C. for 12 hours.

$B_2O_3$ was added to the calcined resultant to make an amount of $B_2O_3$ to be 2 mole % in the garnet-type oxide. The mixture dispersed in 2-propanol was pulverized by using a ball mill for 24 hours, and dried at a temperature of 80° C. The resultant was put in an alumina crucible and sintered in an air atmosphere at 1000° C. for 12 hours.

Example 2

A solid ion conductor was prepared in the same manner as in Example 1, except that an amount of $B_2O_3$ was 5 mole %.

Example 3

A solid ion conductor was prepared in the same manner as in Example 1, except that an amount of $B_2O_3$ was 10 mole %.

Comparative Example 1

A solid ion conductor was prepared in the same manner as in Example 1, except that $B_2O_3$ was not added.

Comparative Example 2

A solid ion conductor was prepared in the same manner as in Example 1, except that 2 mole % of NiO was added instead of $B_2O_3$.

Comparative Example 3

A solid ion conductor was prepared in the same manner as in Example 1, except that 2 mole % of MgO was added instead of $B_2O_3$.

Comparative Example 4

A solid ion conductor was prepared in the same manner as in Example 1, except that 2 mole % of $V_2O_3$ was added instead of $B_2O_3$.

Figure 4A:
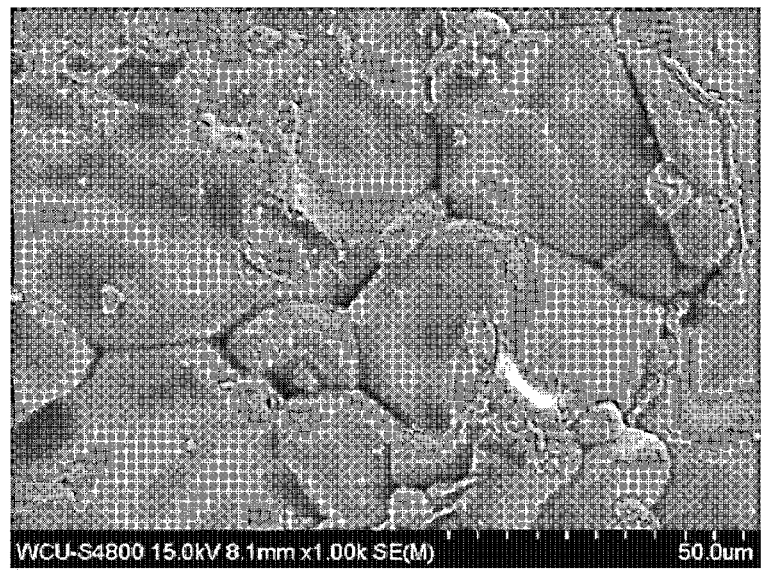
FIGS. 4A to 4D are scanning electron microscope ("SEM") images of solid ion conductors prepared according to Example 1 and Comparative Example 1.
Figure 4B:
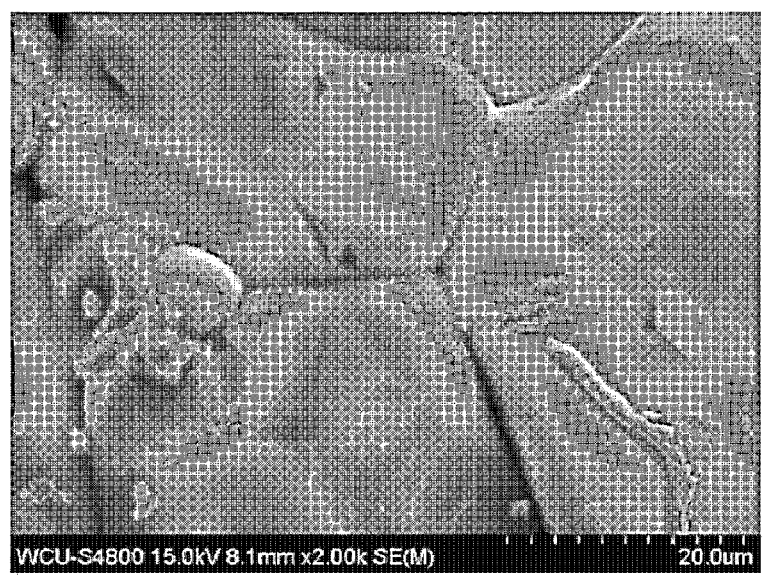
Figure 4C:
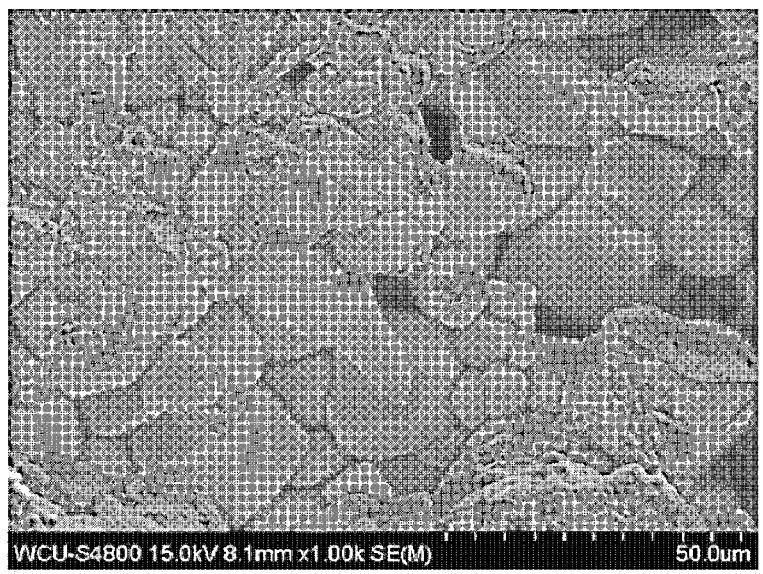
Figure 4D:
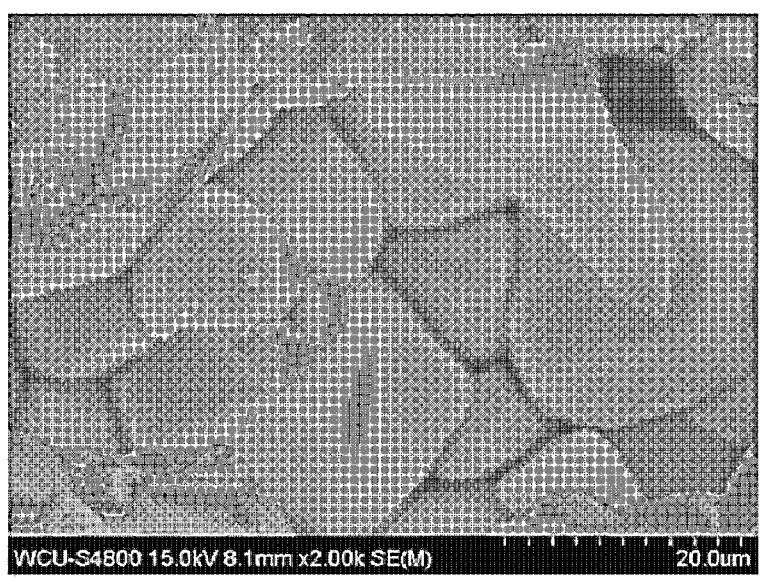

FIGS. 4A to 4D are scanning electron microscope (SEM) images of solid ion conductors prepared according to Example 1 and Comparative Example 1. FIGS. 4A and 4B (a magnified view of FIG. 4A) are corresponded to the solid ion conductor prepared in Example 1, and FIGS. 4C and 4D (a magnified view of FIG. 4C) are corresponded to the solid ion conductor prepared in Comparative Example 1. As shown in FIGS. 4A to 4D, the solid ion conductor prepared by using the method according to an embodiment has a larger grain size and shows mark of the liquid-phase sintering on a surface of the grain. Therefore, it may be confirmed that the sintering of the solid ion conductor prepared according to an embodiment may be performed at a lower temperature better than that of the solid ion conductor prepared in Comparative Example 1 without adding $B_2O_3$.

Evaluation Example 1

X-Ray Diffraction Test

Figure 5:
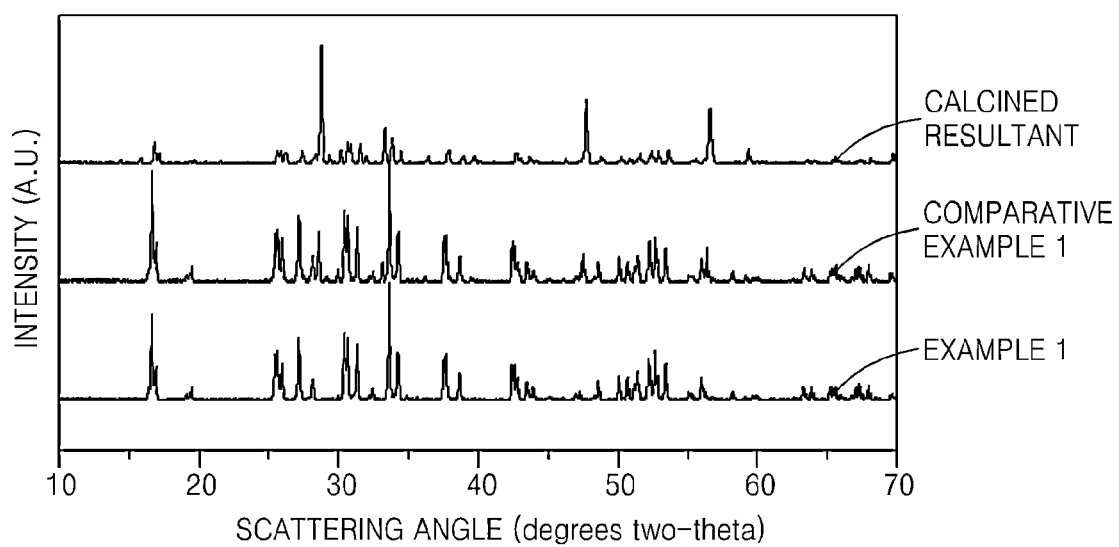
FIG. 5 is a graph of intensity (arbitrary units) versus scattering angle (degrees two-theta, 2θ) showing X-ray diffraction ("XRD") results of the solid ion conductors prepared according to Example 1 and Comparative Example 1.

An X-ray diffraction test was performed on the sintered powders prepared according to Example 1 and Comparative Example 1, and the results are shown in FIG. 5. The obtained XRD spectra were Rietveld-fitted. From the results, it was confirmed that the solid ion conductors of Example 1 and Comparative Example 1 basically had a garnet-type crystal structure. That is, even when $B_2O_3$ was added as in an embodiment, the garnet-type crystal structure of the solid ion conductors was not affected, and $B_2O_3$ existed at a grain boundary.

Evaluation Example 2

Overall Resistance Measurement

Pt was deposited on both surfaces of each of the pellet-type solid ion conductors of Examples 1 to 3 and Comparative Examples 1 to 4 by using a sputter to form a shield electrode. An impedance of each pellet with the shield electrode formed thereon was measured by a 2-probe method by using a Solatron SI1260 impedance/gain-phase analyzer. A frequency range was from 0.1 Hz to 1 MHz, and an amplitude voltage was 20 mV. The impedance was measured in an air atmosphere at 25° C. Resistance values were obtained from an intersection point of an x-axis on the right side and an arc of a Nyquist plot for the impedance measurement results and ionic conductivity of each sample was calculated therefrom.

Figure 6A:
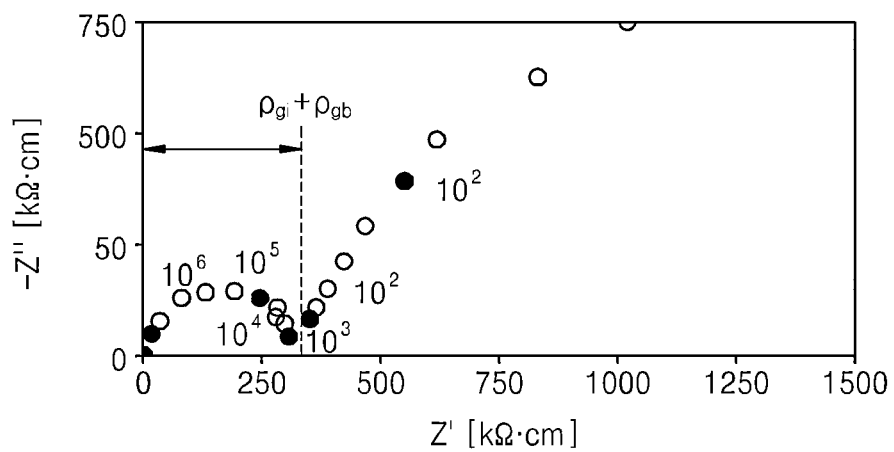
FIGS. 6A to 6E are each a graph of reactance (Z", kiloOhms·centimeters, kΩ·cm) versus resistance (Z', kΩ·cm) showing resistances of the solid ion conductors prepared according to Example 1 and Comparative Examples 1 to 4.
Figure 6B:
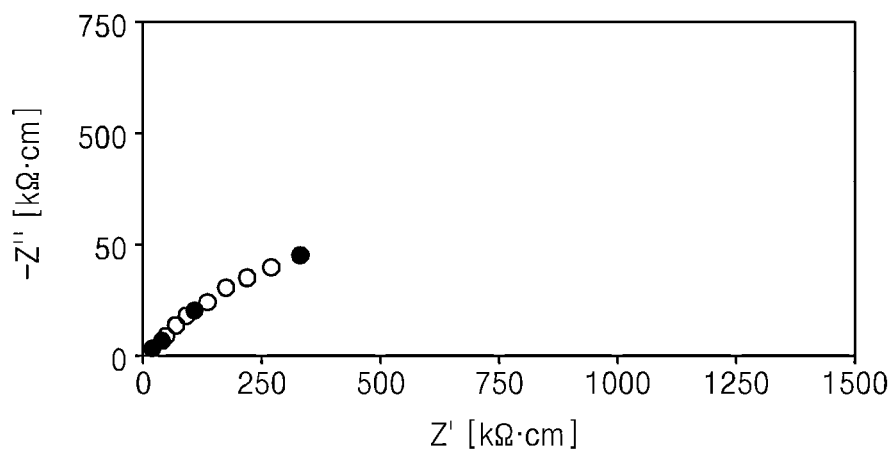
Figure 6C:
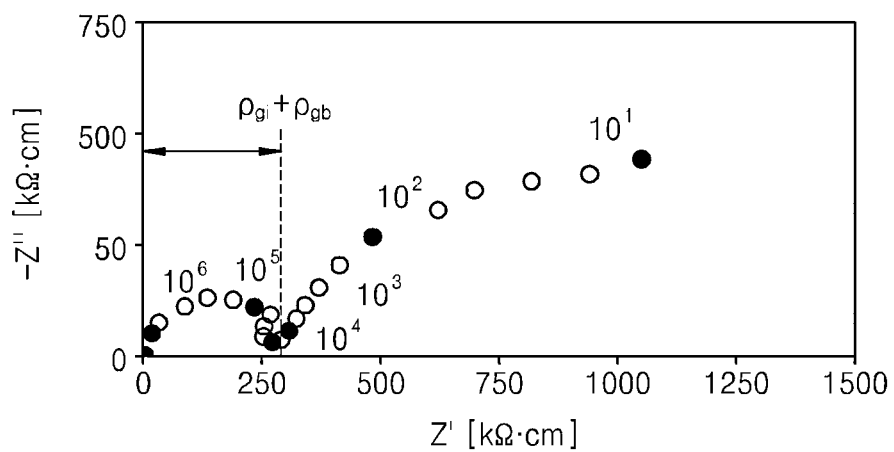
Figure 6D:
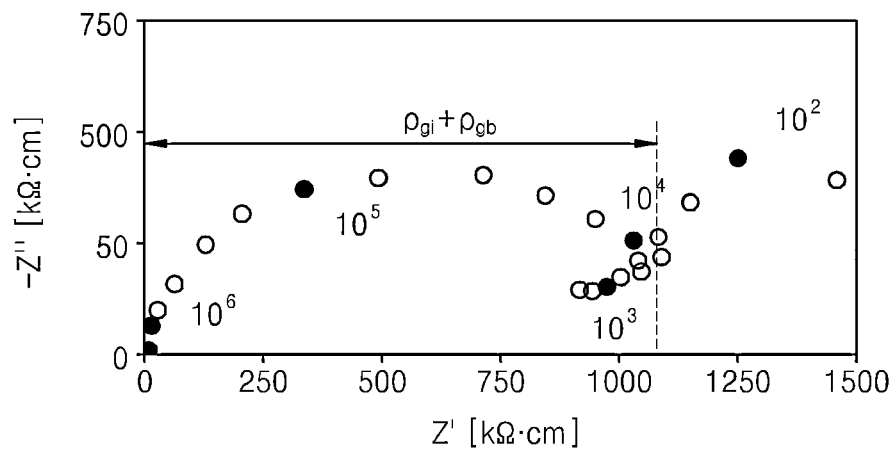
Figure 6E:
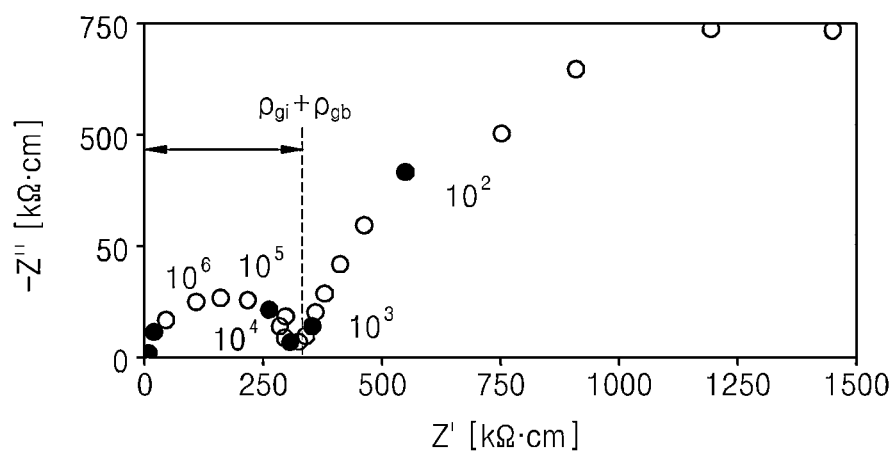
Figure 6F:
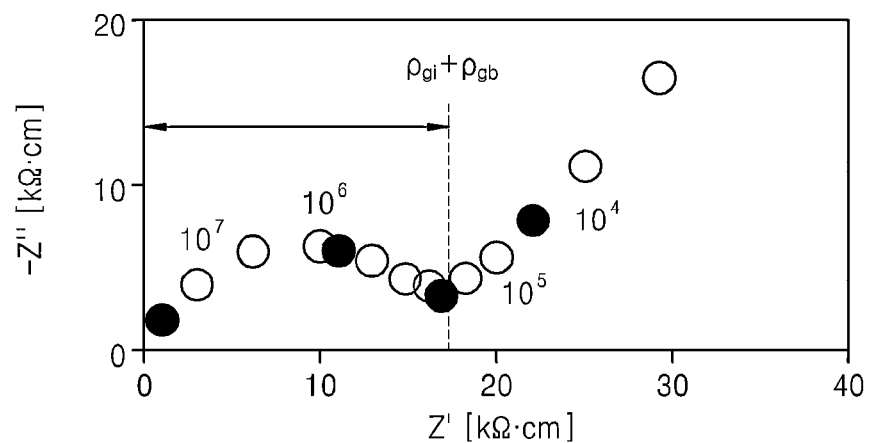
FIG. 6F is an expanded view of FIG. 6B.
Figure 6G:
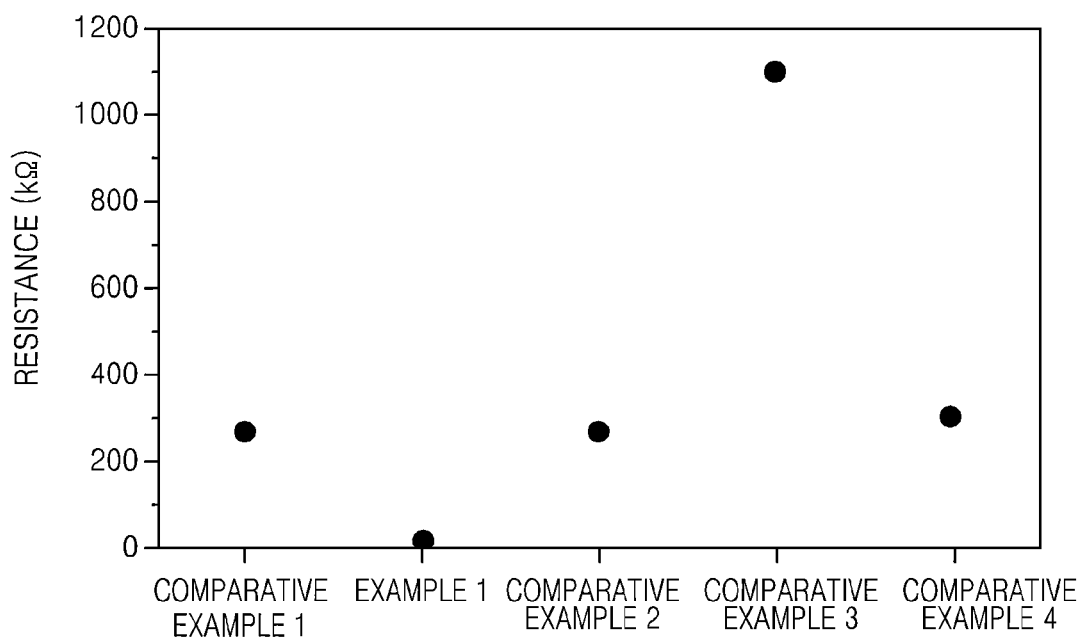
FIG. 6G is a histogram showing the resistance (kiloOhms, kΩ) of the solid ion conductors of Example 1 and Comparative Examples 1 to 4.

FIGS. 6A to 6F are graphs showing specific resistances of the solid ion conductors prepared according to Example 1 and Comparative Examples 1 to 4. Each of FIGS. 6A to 6E shows a graph of the solid ion conductors prepared in Comparative Example 1, Example 1, Comparative Example 2, Comparative Example 3, and Comparative Example 4, respectively. FIG. 6F is an expanded view of FIG. 6B. FIG. 6G is a graph of resistances of the solid ion conductors prepared in Example 1 and Comparative Examples 1 to 4. As shown in FIGS. 6A to 6G, an overall resistance of the solid ion conductor including $B_2O_3$ as an additive agent has a significantly low overall resistance than the others.

FIGS. 7A to 7E are graphs showing resistances of the solid ion conductors prepared according to Examples 1 to 3.

Figure 7A:
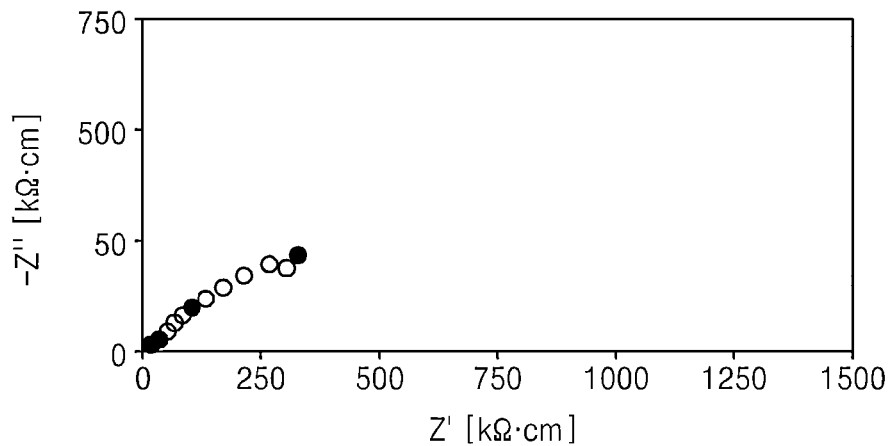
FIGS. 7A to 7C are each a graph of reactance (Z", kiloOhms·centimeters, kΩ·cm) versus resistance (Z', kΩ·cm) showing resistances of the solid ion conductors prepared according to Examples 1 to 3.
Figure 7B:
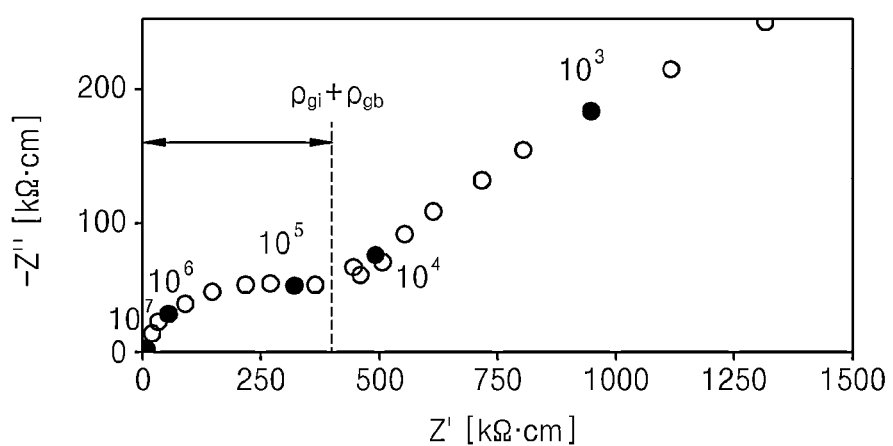
Figure 7C:
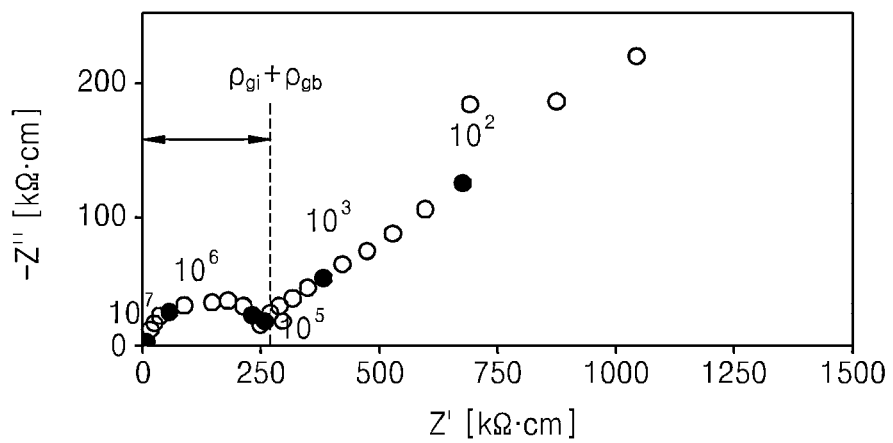
Figure 7D:
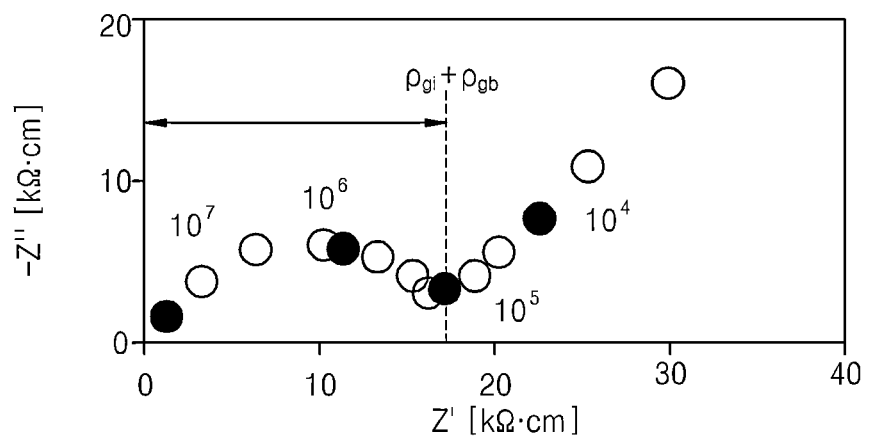
FIG. 7D is an expanded view of FIG. 7A.
Figure 7E:
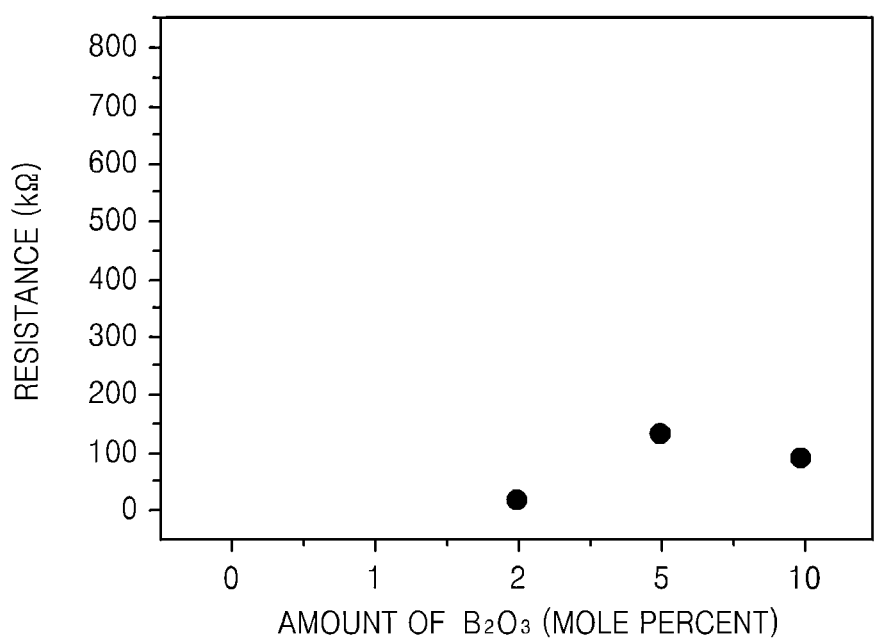
FIG. 7E is a graph of resistance (kiloOhms, kΩ) versus amount of $B_2O_3$ (parts by mole) showing the resistance of each of the solid ion conductors prepared according to Examples 1 to 3.

FIGS. 7A to 7C show graphs illustrating specific resistances according to an amount of $B_2O_3$. FIG. 7D is an expanded view of FIG. 7A. FIG. 7E is a graph illustrating a resistance according to an amount of $B_2O_3$. As shown in FIGS. 7A to 7E, an overall resistance of the solid ion conductor including $B_2O_3$ as an additive is significantly lower than that of the solid ion conductors without an additive.

As described above, according to the one or more of the above embodiments, a solid ion conductor with excellent ionic conductivity at a low sintering temperature and various types of lithium batteries including the solid ion conductor may be obtained.

It should be understood that the exemplary embodiments described herein should be considered in a descriptive sense only and not for purposes of limitation. Descriptions of features, advantages, or aspects within each embodiment should be considered as available for other similar features, advantages or aspects in other embodiments.

What is claimed is:

1. A solid ion conductor comprising:
a garnet oxide represented by Formula 1:

$$L_{5+x+2y}(D_y, E_{3-y})(Me_z, M_{2-z})O_d \qquad \text{Formula 1}$$

wherein
L is at least one of a monovalent cation or a divalent cation,
D is a monovalent cation,
E is a trivalent cation,
Me and M are each independently a trivalent, tetravalent, pentavalent, or a hexavalent cation,
$0<x+2y\leq3$, $0\leq y\leq0.5$, $0\leq z<2$, and $0<d\leq12$,
wherein O is partially or totally substituted with at least one of a pentavalent anion, a hexavalent anion, or a heptavalent anion; and
$B_2O_3$.

2. The solid ion conductor of claim 1, wherein an amount of $B_2O_3$ is in a range of about 0.5 mole percent to about 10 mole percent, based on a total moles of the garnet oxide.

3. The solid ion conductor of claim 1, wherein an ionic conductivity of the solid ion conductor is $2.0\times10^{-4}$ Siemens per centimeter or more at a temperature of 25° C.

4. The solid ion conductor of claim 1, wherein an overall resistance of the solid ion conductor is in a range of about 0 kiloOhms to about 200 kiloOhms.

5. The solid ion conductor of claim 1, wherein the $B_2O_3$ is present at a grain boundary of the garnet oxide.

6. The solid ion conductor of claim 1, wherein M of Formula 1 is Zr, Ta, Bi, Sb, or Nb.

7. The solid ion conductor of claim 1, wherein E of Formula 1 is La, and M of Formula 1 is Zr.

8. The solid ion conductor of claim 1, wherein D of Formula 1 is K, Rb, or Cs.

9. The solid ion conductor of claim 1, wherein Me of Formula 1 is at least one selected of Ta, Nb, Y, Sc, W, Mo, Sb, Bi, Hf, V, Ge, Si, Al, Ga, Ti, Co, In, Zn, or Cr.

10. The solid ion conductor of claim 1, wherein L of Formula 1 is at least one of Li, Na, Mg, Ca, K, or H.

11. A solid electrolyte comprising the solid ion conductor of claim 1.

12. An all-solid-state lithium battery comprising the solid electrolyte of claim 11.

13. A lithium battery comprising:
a positive electrode comprising a positive active material;
a negative electrode comprising a negative active material; and
an organic electrolytic solution,
wherein at least one of the positive electrode, the negative electrode, and the organic electrolytic solution comprises the solid ion conductor according to claim 1.

14. The lithium battery of claim 13, wherein the solid ion conductor is disposed on a surface of at least one of the positive active material and the negative active material.

15. A lithium air battery comprising:
a positive electrode;
a negative electrode; and
a separator,
wherein an ion conductive membrane comprises the solid ion conductor of claim 1 and is disposed on a surface of at least one of the positive electrode, the negative electrode, and the separator.

16. A method of manufacturing the solid ion conductor of claim 1, the method comprising:
contacting precursors of a garnet oxide to form a precursor mixture;
calcining the precursor mixture to form a calcined mixture;
combining the calcined mixture and $B_2O_3$; and
sintering the mixture of the calcined mixture and the $B_2O_3$ to manufacture the solid ion conductor.

17. The method of claim 16, wherein the sintering is performed at a temperature in a range of about 800° C. to about 1250° C. for about 2 hours to about 40 hours.

* * * * *